United States Patent
Szuchman-Sapir

(10) Patent No.: US 12,433,864 B2
(45) Date of Patent: Oct. 7, 2025

(54) 5,6-diHETE LACTONE FOR TREATMENT OF MICROVASCULAR DYSFUNCTION

(71) Applicant: MIGAL GALILEE RESEARCH INSTITUTE LTD., Kiryat Shmona (IL)

(72) Inventor: Andrea Szuchman-Sapir, Upper Galilee (IL)

(73) Assignee: MIGAL GALILEE RESEARCH INSTITUTE LTD., Kiryat Shmona (IL)

( * ) Notice: Subject to any disclaimer, the term of this patent is extended or adjusted under 35 U.S.C. 154(b) by 946 days.

(21) Appl. No.: 17/615,670

(22) PCT Filed: Jun. 2, 2020

(86) PCT No.: PCT/IL2020/050610
§ 371 (c)(1),
(2) Date: Dec. 1, 2021

(87) PCT Pub. No.: WO2020/245816
PCT Pub. Date: Dec. 10, 2020

(65) Prior Publication Data
US 2022/0241233 A1    Aug. 4, 2022

Related U.S. Application Data

(60) Provisional application No. 62/856,266, filed on Jun. 3, 2019.

(51) Int. Cl.
*A61K 31/202*    (2006.01)
*A61K 9/00*    (2006.01)
*A61P 9/12*    (2006.01)

(52) U.S. Cl.
CPC .......... *A61K 31/202* (2013.01); *A61K 9/0019* (2013.01); *A61P 9/12* (2018.01)

(58) Field of Classification Search
CPC ........ A61K 31/202; A61K 9/0019; A61P 9/12
See application file for complete search history.

(56) References Cited

U.S. PATENT DOCUMENTS

2015/0374660 A1    12/2015    Goel
2023/0121245 A1    4/2023    Coronado

FOREIGN PATENT DOCUMENTS

| EP | 1077936 B1 | 10/2005 |
| WO | 1999004783 A1 | 2/1999 |
| WO | 2017121916 A1 | 7/2017 |
| WO | 2017156164 A1 | 9/2017 |
| WO | 2023146984 A1 | 8/2023 |

OTHER PUBLICATIONS

Fulton, D. et al. "A method for the determination of 5,6-EET using the lactone as an intermediate in the formation of the diol" J. Lipid Res. 1998 39: 1713-1721. (Year: 1998).*
Fulton et al. "A method for the determination of 5,6-EET using the lactone as an intermediate in the formation of the diol" J. Lip. Res. (1998) vol. 39, 1713-1721. (Year: 1998).*
Gilad, D et al. "Paraoxonase 1 in endothelial cells impairs vasodilation induced by arachidonic acid lactone metabolite." BBA—Molecular Cell Biology of Lipids, (2019) 1864, 386-393, as cited in the IDS dated Jan. 18, 2024. (Year: 2019).*
Zhang, X et al. "Systematic Metabolomic Analysis of Eicosanoids after Omega 3 Polyunsaturated Fatty Acid Supplementation by a Highly Specific Liquid Chromatography Tandem Mass Spectrometry-Based Method." J. Proteome Res., (2015) 14, 1843-1853 (Year: 2015).*
Jin Endo et al.; "Cardioprotective mechanism of omega-3 polyunsaturated fatty acids"; Journal of cardiology 67; dx.doi.org/10.1016/j.jjcc.2015.08.002; . 2016; pp. 22-27, 6 pages.
Suzy Eryanni-Levin et al.; "5,6-delta-dhtl, a stable metabolite of arachidonic acid, is a potential substrate for paraoxonase 1"; Biochim Biophys Acta 1851; dx.doi.org/10.1016/j.bbalip.2015.04.008; 2015, pp. 1118-1122, 5 pages.
Lauterbach B, et al.; "Cytochrome p450-dependent eicosapentaenoic acid metabolites are novel bk channel activators" Hypertension:39; www.hypertensionaha.org; 2001, pp. 609-613, 5 pages.
Reut Levi-Rosenzvig et al; "5,6-delta-dhtl, a stable metabolite of arachidonic acid, is a potential EDHF that mediates microvascular dilation"; Free Radic Biol Med 103; dx.doi.org/10.1016/j.freeradbiomed.2016.12.022 ; 2017; pp. 87-94; 8 pages.
Paige Miller et al.; Long-chain omega-3 fatty acids eicosapentaenoic acid and docosahexaenoic acid and blood pressure: A meta-analysis of randomized controlled trials American journal of hypertension 27; 2014; pp. 885-896; 12 pages.
Morisseau C, et al.; "Naturally occurring monoepoxides of eicosapentaenoic acid and docosahexaenoic acid are bioactive antihyperalgesic lipids"; Journal of Lipid Research vol. 51, 2010; pp. 3481-3490; 10 pages.
Mozaffarian D et al.; "Omega-3 fatty acids and cardiovascular disease: Effects on risk factors, molecular pathways, and clinical events" Journal of the American College of Cardiology, vol. 58 No. 20; 2011; pp. 2047-2067, 21 pages.
Siscovick DS, et al.; "Omega-3 polyunsaturated fatty acid (fish oil) supplementation and the prevention of clinical cardiovascular disease"; A science advisory from the american heart association 135; Circulation 2017, 18 pages.
Tousoulis D, et al.; "Omega-3 pufas improved endothelial function and arterial stiffness with a parallel antiinflammatory effect in adults with metabolic syndrome." Atherosclerosis 232; 2014: pp. 10-16, 7 pages.
Wang DD, et al. "Association of specific dietary fats with total and cause-specific mortality"; JAMA internal medicine 176; 2016; pp. 1134-1145; 12 pages.

(Continued)

*Primary Examiner* — Joseph K McKane
*Assistant Examiner* — Jalisa Holmes Ferguson
(74) *Attorney, Agent, or Firm* — The Roy Gross Law Firm, LLC; Roy D. Gross

(57) ABSTRACT

The present invention provides 5,6 dihydroxyeicosatetraenoic acid (5,6-diHETE) lactone or a pharmaceutical composition comprising 5,6-diHETE lactone and a pharmaceutically acceptable carrier, and uses thereof for inducing vasodilation, for treating a disease, disorder or condition associated with microvascular dysfunction, or for preventing, or reducing the risk of, developing a cardiac condition associated with microvascular dysfunction.

6 Claims, 9 Drawing Sheets

(56) References Cited

OTHER PUBLICATIONS

Wiest EF, et al.; "Dietary omega-3 polyunsaturated fatty acids prevent vascular dysfunction and attenuate cytochrome p4501a1 expression by 2,3,7,8-tetrachlorodibenzo-p-dioxin" Toxicological sciences : an official journal of the Society of Toxicology vol. 154; 2016, pp. 43-54; 12 pages.

Yang W, et al.; "Stable 5,6-epoxyeicosatrienoic acid analog relaxes coronary arteries through potassium channel activation" Hypertension, vol. 45; 2005; pp. 681-686; 6 pages.

Ye D, et al.; "Cytochrome p-450 epoxygenase metabolites of docosahexaenoate potently dilate coronary arterioles by activating large-conductance calcium-activated potassium channels" The Journal of pharmacology and experimental therapeutics, vol. 303 No. 2; 2002, pp. 768-776, 9 pages.

Taiki Hamabata et al.; "5,6-DiHETE attenuates vascular hyperpermeability by inhibiting Ca2+ elevation in endothelial cells"; Journal of Lipid Research vol. 59, 2018; pp. 1864-1870; 7 pages.

Han Bing et al., (Feb. 29, 2012) 20-hydroxyeicosanothiocarbamate Enoic acid in blood pressure and vasomotor Moderating Effects in Function. Chinese Journal of Arteriosclerosis, No. 20, vol. Issue 2.

Dempsey SK, Gesseck AM, Ahmad A, Daneva Z, Ritter JK, Poklis JL. Formation of HETE-EAs and dihydroxy derivatives in mouse kidney tissue and analysis by high-performance liquid chromatography tandem mass spectrometry. J Chromatogr B Analyt Technol Biomed Life Sci. Sep. 15, 2019;1126-1127:121748. doi: 10.1016/j.jchromb.2019.121748. Epub Aug. 6, 2019. PMID: 31437772; PMCID: PMC6935345.

Guo S-L et al. (Dec. 31, 2006) Comparison of Effects of 15-HETE and Its Metabolites on Rat Pulmonary Arterial Rings. Chinese Journal of Comparative Medicine, No. 12.

Pinhas S, Amram E, Slutsky-Smith E, Ertracht O, Atar S, Chuyun D, Szuchman-Sapir A. Paraoxonase 1 hydrolysis of EPA-derived lactone impairs endothelial-mediated vasodilation. Prostaglandins Other Lipid Mediat. Oct. 2022;162:106665. doi: 10.1016/j.prostaglandins.2022.106665. Epub Jul. 9, 2022. PMID: 35817276.

Yi, X. et al. Interactions Among CYP2C8, EPHX2, and CYP4A11 Variants and CYP Plasma Metabolite Levels in Ischemic Stroke. Journal of Atherosclerosis and Thrombosis. vol. 2 Issue 11. epub Apr. 16, 2016.

Gilad, D., Atiya, S., Mozes-Autmazgin, Z., Ben-Shushan, R. S., Ben-David, R., Amram, E., . . . Szuchman-Sapir, A. (2018). Paraoxonase 1 in endothelial cells impairs vasodilation induced by arachidonic acid lactone metabolite. Biochimica et Biophysica Acta (BBA)—Molecular and Cell Biology of Lipids. doi:10.1016/j.bbalip.2018.12.008.

Eryanni-Levin, S., Khatib, S., Levy-Rosenzvig, R., Tamir, S., & Szuchman-Sapir, A. (2015). 5,6-δ-DHTL, a stable metabolite of arachidonic acid, is a potential substrate for paraoxonase 1. Biochimica et Biophysica Acta (BBA)—Molecular and Cell Biology of Lipids, 1851(9), 1118-1122. doi:10.1016/j.bbalip.2015.04.008.

Freed, J. K., & Gutterman, D. D. (2017). Communication Is Key: Mechanisms of intercellular signaling in vasodilation. Journal of Cardiovascular Pharmacology, 69(5), 264-272. doi:10.1097/fjc.0000000000000463.

D. Fulton, J. R. Falck, J. C. McGiff, M. A. Carroll, and J. Quilley. A method for the determination of 5,6-EET using the lactone as an intermediate in the formation of the diol. Department of Cell Biology, UMDNJ-School of Osteopathic Medicine, Two Medical Center Drive, Stratford, NJ 08084; Department of Pharmacology,† New York Medical College, Valhalla, NY 10595; and Department of Molecular Genetics,§ University of Texas Southwestern Medical Center, Dallas, Texas 75245.

Gutterman, D. D., Chabowski, D. S., Kadlec, A. O., Durand, M. J., Freed, J. K., Ait-Aissa, K., & Beyer, A. M. (2016). The Human Microcirculation. Circulation Research, 118(1), 157-172. doi:10.1161/circresaha.115.305364.

Imig, J. D. (2016). Epoxyeicosatrienoic Acids and 20-Hydroxyeicosatetraenoic Acid on Endothelial and Vascular Function. Endothelium, 105-141. doi:10.1016/bs.apha.2016.04.003.

Kujal, P., Čertíková Chábová, V., Škaroupková, P., Husková, Z., Vernerová, Z., Kramer, H. J., . . . Červenka, L. (2014). Inhibition of soluble epoxide hydrolase is renoprotective in 5/6 nephrectomized Ren-2 transgenic hypertensive rats. Clinical and Experimental Pharmacology and Physiology, 41(3), 227-237. doi:10.1111/1440-1681.12204.

Lai, L., Wang, R., Jiang, W., Yang, X., Song, J., Li, X., & Tao, G. (2009). Effects of docosahexaenoic acid on large-conductance Ca2+-activated K+ channels and voltage-dependent K+ channels in rat coronary artery smooth muscle cells. Acta Pharmacologica Sinica, 30(3), 314-320. doi:10.1038/aps.2009.7.

Marowsky, A., Burgener, J., Falck, J. R., Fritschy, J.-M., & Arand, M. (2009). Distribution of soluble and microsomal epoxide hydrolase in the mouse brain and its contribution to cerebral epoxyeicosatrienoic acid metabolism. Neuroscience, 163(2), 646-661. doi:10.1016/j.neuroscience.2009.0.

Qin, J., Sun, D., Jiang, H., Kandhi, S., Froogh, G., Hwang, S. H., . . . Huang, A. (2015). Inhibition of soluble epoxide hydrolase increases coronary perfusion in mice. Physiological Reports, 3(6), e12427. doi:10.14814/phy2.12427.

D.C. Zeldin, J. Kobayashi, J.R. Falck, B.S. Winder, B.D. Hammock, J.R. Snapper, J.H. Capdevila. Regio- and enantiofacial selectivity of epoxyeicosatrienoic acid hydration by cytosolic epoxide hydrolase. Journal of Biological Chemistry, vol. 268, Issue 9, 1993, pp. 6402-6407, ISSN 0021-9258, https://doi.org/10.1016/S0021-9258(18)53266-X.

* cited by examiner

5,6-diHETE LACTONE FOR TREATMENT OF MICROVASCULAR DYSFUNCTION

CROSS REFERENCE TO RELATED APPLICATIONS

This application is the U.S. National Phase under 35 U.S.C. § 371 of International Application No. PCT/IL2020/050610 filed Jun. 2, 2020, designating the U.S. and published as WO2020245816 on Dec. 10, 2020, which claims the benefit of U.S. Provisional Application No. 62/856,266 filed Jun. 3, 2019. Any and all applications for which a foreign or domestic priority claim is identified above and/or in the Application Data Sheet as filed with the present application are hereby incorporated by reference under 37 CFR 1.57.

FIELD OF THE INVENTION

The present invention relates to the use of 5,6 dihydroxyeicosatetraenoic acid (5,6-diHETE) lactone in the treatment of microvascular dysfunction and related conditions.

BACKGROUND OF THE INVENTION

Hypertension, or high blood pressure, is a major risk factor for coronary heart disease and stroke, and it remains the most common chronic disease worldwide, affecting an estimated 76.4 million adults in the United States and upward of 1 billion persons globally (Heart disease and stroke statistics-2017 update: A report from the American heart association. Circulation. 2017:135:e146). Despite the ubiquity of this disease and the vast number of effective treatments, in nearly one of every two persons with hypertension in the US hypertension remains uncontrolled. There are five classes of pharmacological drugs for antihypertensive treatment, either as monotherapy or in combinations: 1) diuretics, 2) beta-blockers, 3) calcium channel antagonists, 4) angiotensin converting enzyme (ACE) inhibitors and 5) angiotensin receptor blockers. These antihypertensive treatments reduce the elevated incidence of cardiovascular (CV) morbid and fatal events related to high blood pressure (BP). However, among US adults with hypertension, 11.8% met the criteria for resistant hypertension (systolic BP/diastolic BP≥140/90 mmHg and reported use of antihypertensive medications from 3 different drug classes or drugs from ≥4 antihypertensive drug classes regardless of BP). These data emphasize the need for new drugs to combat hypertension via new mechanisms of action.

Blood pressure (BP) is regulated by a variety of factors that influence arteriolar vasomotor tone. Maintenance of normal blood pressure relies on a balance of small diameter artery constriction and dilation that contributes to peripheral vascular resistance. Under physiological circumstances, the large arteries contribute only about 7% to the overall coronary resistance, while coronary arterioles (50-150 μm in diameter) are considered the primary regulation site of flow to the heart. The ability of these small blood vessels to constrict or dilate in response to the changing metabolic demands of specific tissues is of paramount importance for cardiovascular (CV) homeostasis and it is dependent of receptor mediated signaling that occurs within endothelial cells (ECs) and smooth muscle cells (SMCs). Any perturbation in these signaling processes in resistance arteries can shift blood pressure away from homeostasis. Microvascular dysfunction refers to a heterogeneous set of conditions ranging from reduced organ maximal perfusion to impaired endothelium-dependent dilation of isolated arterioles. The loss of endothelium-dependent relaxation is a significant independent risk factor for CV events in hypertensive patients. It is present in the early course of all known CV diseases, including hypercholesterolemia, atherosclerosis, angina and diabetes.

The balance between local regulation of vascular tone and vascular pathophysiology can vary depending on which factors are released from the endothelium. Physical and chemical stimuli cause endothelium-mediated dilation by stimulating the generation of mediators including prostaglandin 12 (prostacyclin; PGI2), nitric oxide (NO), as well as the endothelial-derived hyperpolarizing factors (EDHFs). The term EDHF refers to a chemically diverse group of compounds that are characterized by their strict dependence on the activity of $Ca^{2+}$-sensitive potassium ($K^+$) channels of endothelial cells. Prominent among the EDHF factors are the arachidonic acid metabolites.

Arachidonic acid is a ω-6 long-chain polyunsaturated fatty acid (LC-PUFA). The cytochrome P450 (CYP)-dependent metabolism of arachidonic acid is often referred to as the third pathway for arachidonic acid metabolism, in addition to the COX and LOX pathways. The CYP-generated products, arachidonic acid-derived epoxides and diols are dominant compared to metabolites of the other pathways, in terms of their effects on physiology and pathophysiology. Epoxyeicosatrienoic acids (EETs) are formed by the enzymes of the CYP2C and CYP2J families in the proximal tubule, collecting duct, and renal vascular endothelium. They act as EDHFs in the renal microcirculation by activating big potassium (BK) channels in vascular smooth muscle cells (VSMCs) and contribute to the nitric oxide and COX-independent components of the vasodilator response of the afferent arterioles to acetylcholine (ACh), bradykinin, and adenosine.

The ω-3 LC-PUFAs constitute another class of dietary lipids found in fish and having a metabolism similar to that of arachidonic acid. A potential metabolite of this class, 5,6-diHETE lactone, was examined for its ability to induce endothelial hyperpolarization and to elicit vascular dilation.

SUMMARY OF INVENTION

In a first aspect, the present invention provides a pharmaceutical composition comprising 5,6 dihydroxyeicosatetraenoic acid (5,6-diHETE) lactone and a pharmaceutically acceptable carrier.

In a second aspect, the present invention provides 5,6 dihydroxyeicosatetraenoic acid (5,6-diHETE) lactone or a pharmaceutical composition comprising it, for use in inducing vasodilation in a subject in need thereof.

In a third aspect, the present invention provides 5,6 dihydroxyeicosatetraenoic acid (5,6-diHETE) lactone or a pharmaceutical composition comprising it, for use in treating a disease, disorder or condition associated with microvascular dysfunction in a subject in need thereof.

In a fourth aspect, the present invention provides 5,6 dihydroxyeicosatetraenoic acid (5,6-diHETE) lactone or a pharmaceutical composition comprising it, for use in preventing, or reducing the risk of, developing a cardiac disease or disorder associated with microvascular dysfunction in a subject at risk thereof.

In a fifth aspect, the present invention provides a method of inducing vasodilation in a subject in need thereof comprising administering to the subject a pharmaceutical composition comprising 5,6 dihydroxyeicosatetraenoic acid (5,6-diHETE) lactone and a pharmaceutically acceptable carrier.

In a sixth aspect, the present invention provides a method of treating a disease, disorder or condition associated with microvascular dysfunction comprising administering to a subject in need thereof a pharmaceutical composition comprising 5,6 dihydroxyeicosatetraenoic acid (5,6-diHETE) lactone and a pharmaceutically acceptable carrier.

In a seventh aspect, the present invention provides a method of preventing, or reducing the risk of, developing a cardiac condition associated with microvascular dysfunction, comprising administering to a subject in need thereof a pharmaceutical composition comprising 5,6 dihydroxyeicosatetraenoic acid (5,6-diHETE) lactone and a pharmaceutically acceptable carrier.

DETAILED DESCRIPTION OF THE INVENTION

The ω-3 long-chain polyunsaturated fatty acids (LC-PUFAs)-derived S-lactone 5,6 dihydroxyeicosatetraenoic acid (5,6-diHETE) lactone can conceivably be metabolized in the human body from 5,6-epoxyeicosatetraenoic acid (the epoxide isomer on $C_5$ of the eicosapentaenoic acid, a type of ω-3 LC-PUFA metabolite). However, to the best of the inventor's knowledge, this lactone has never been shown to be present in animal tissues, and there has never been an effort or a suggestion for a physiological role for it.

Figure 1A:
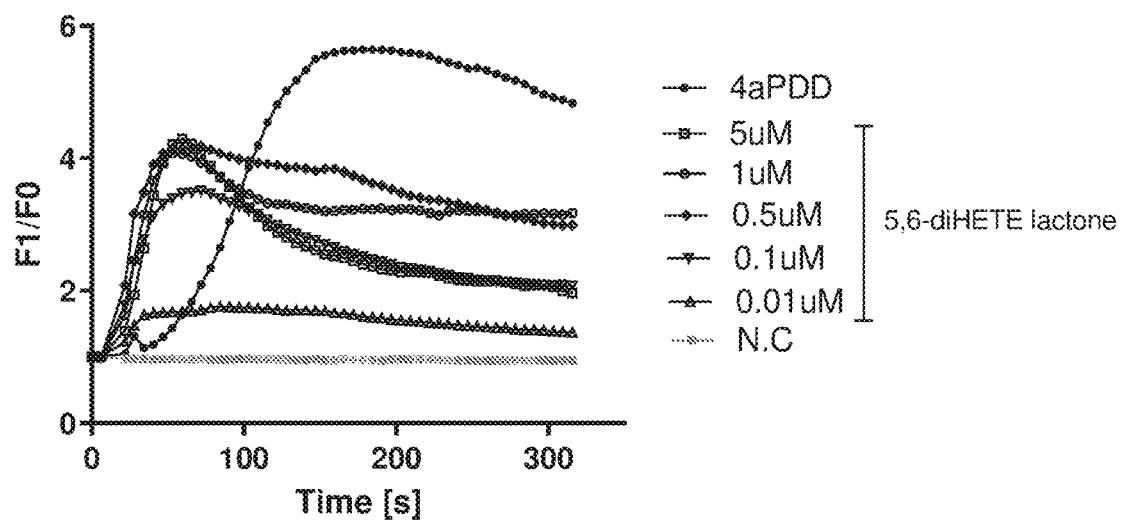
FIGS. 1A-1C show a dose dependent intracellular calcium ($[Ca^{2+}]i$) increase induced by 5,6-diHETE lactone. A. Changes in $[Ca^{2+}]i$ in HUVEC cells were induced by 5,6-diHETE lactone in a dose-dependent manner (0.01-5 μmol/L), as measured by means of fluorescence intensity of Fluo4, using a confocal microscope. F1 represents intensity at each time point, and F0 represents basal intensity. The solvent (1.6% EtOH) was used as negative control (N.C). 4α-phorbol-12, 13-didecanoate (4α-PDD; a specific TRPV4 (Transient Receptor Potential Cation Channel) agonist; 10 μmol/L) served as positive control. B. The calculated ratio between maximal intensity (F1max) and basal intensity (F0). C. Concentration-responses curve for $EC_{50}$ calculation (EC50=0.009943 μM). RLU—relative units. All data represent mean±SD of 20 cells per well in 1-6 independent experiments. Columns represent the F1max/F0. The statistical analysis was performed using one-way ANOVA with Tukey's post hoc test, asterisks represent a significant difference from the negative control, **p<0.01.
Figure 1B:
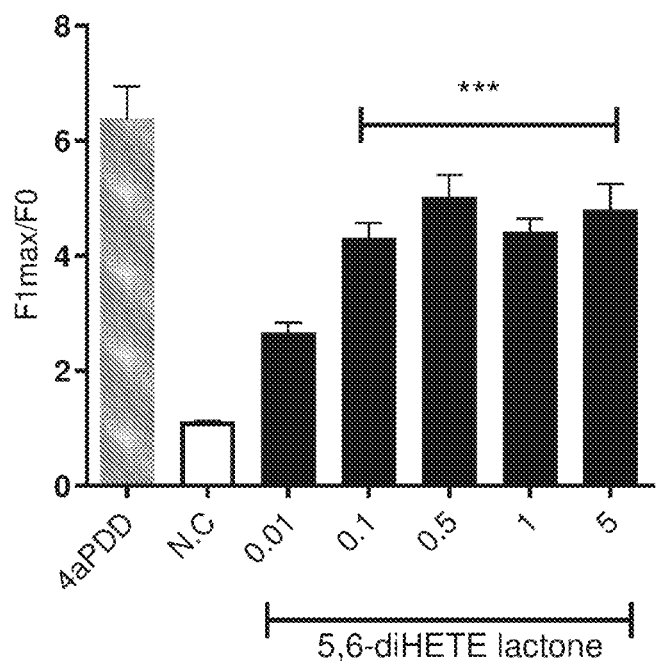
Figure 1C:
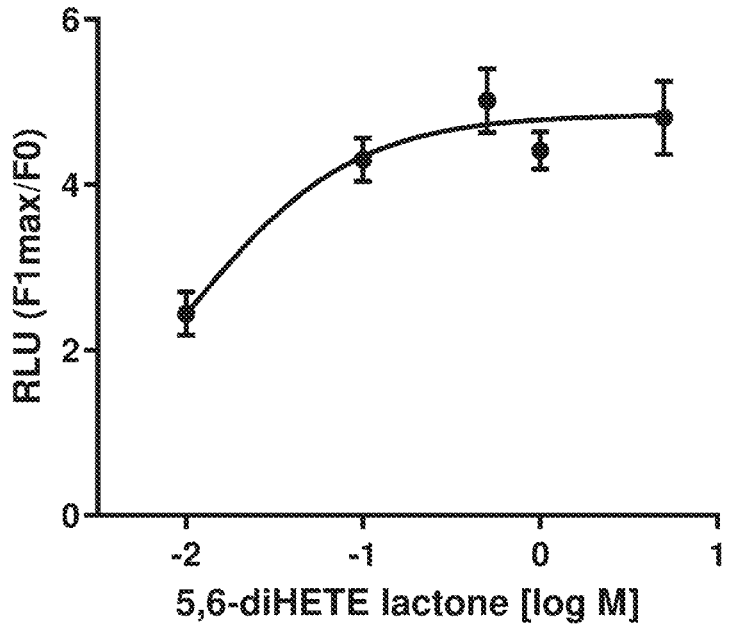
Figure 2:
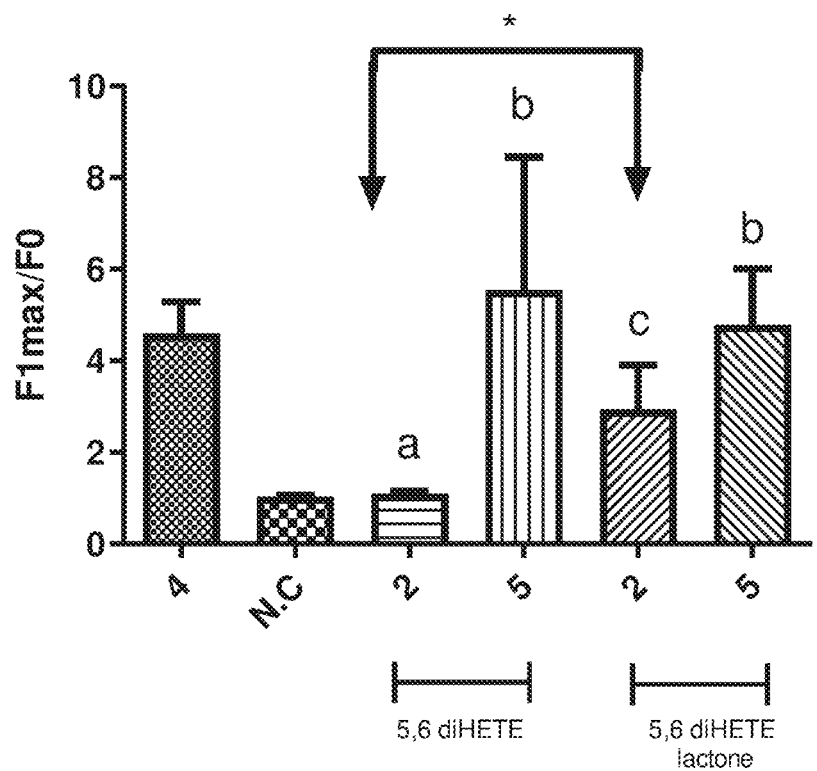
FIG. 2 Shows a comparison of $[Ca^{2+}]i$ increase by 5,6-diHETE lactone Vs. 5,6 diHETE (the hydrolytic isomer). Changes in $[Ca^{2+}]i$ were induced in HUVEC by 2 μmol/L of 5,6-diHETE lactone but not by 2 μmol/L of the hydrolytic isomer. The solvent (1.6% EtOH) was used as negative control (N.C). 4α-phorbol-12, 13-didecanoate (4α-PDD; a specific TRPV4 agonist; 10 μmol/L) served as positive control. All data represent mean±SD of 20 cells per well, 3-5 wells in each experiment, in 1-2 independent experiments. The statistical analysis was performed using one-way ANOVA with Tukey's post hoc test. Different letters represent a significant difference between the different concentrations and the asterisk represent a significant difference between the lactone isomer to the hydrolytic isomer, **p<0.05. Columns represent the F1max/F0.

The invention is based on the surprising finding that 5,6-diHETE lactone is capable of causing relaxation of blood vessels. This effect appears to be caused by its ability to increase intracellular $[Ca^{2+}]$ levels. The examples show that the 5,6-diHETE lactone mediates intracellular $[Ca^{2+}]$ increase in endothelial cells with a higher efficacy than that found for the hydrolytic isomer 5,6-diHETE. In experiments done in HUVEC cells, the 5,6-diHETE lactone caused a significant $[Ca^{2+}]$ increase already at a low concentration of 0.01 μmol/L (FIG. 1), while the hydrolytic isomer 5,6-diHETE caused a significant $[Ca^{2+}]$ increase only starting at a concentration of 5 μmol/L (FIG. 2).

Additional examples show that 5,6-diHETE lactone mediates vasodilation in mesenteric arteries of mice (Example 2) and in human adipose arterioles (HAAs) (Example 3) from normotensive as well as from hypertensive human subjects.

Therefore, in a first aspect, the present invention provides a pharmaceutical composition comprising 5,6 dihydroxyeicosatetraenoic acid (5,6-diHETE) lactone and a pharmaceutically acceptable carrier In some embodiments, the pharmaceutical composition of the invention consists essentially of 5,6-diHETE lactone and a pharmaceutically acceptable carrier.

The phrase "consists essentially of" as used herein means that the 5,6-diHETE lactone is the only active agent in the pharmaceutical composition. However, inactive agents such as those used in compositions and particularly in pharmaceutical compositions, including carriers, solvents, dispersion media, preservatives, antioxidants, coatings, and isotonic and absorption delaying agents, may be comprised in the composition of the invention.

Pharmaceutical compositions of the present invention may be formulated in a conventional manner using one or more physiologically acceptable carriers or excipients. The carrier(s) must be "acceptable" in the sense of being compatible with the other ingredients of the composition and not deleterious to the recipient thereof.

The term "carrier" refers to a diluent, adjuvant, excipient, or vehicle with which the active agent is administered. The carriers in the pharmaceutical composition may comprise a binder, such as microcrystalline cellulose, polyvinylpyrrolidone (polyvidone or povidone), gum tragacanth, gelatin, starch, lactose or lactose monohydrate; a disintegrating agent, such as alginic acid, maize starch and the like; a lubricant or surfactant, such as magnesium stearate, or sodium lauryl sulphate; and a glidant, such as colloidal silicon dioxide.

The pharmaceutical composition may be administered by any suitable route. In some embodiments, the pharmaceutical composition is formulated for systemic administration. In some embodiments, the pharmaceutical composition is formulated for local administration.

In some embodiments, the pharmaceutical composition is formulated for administration by injection. In some embodiments, the pharmaceutical composition is formulated for administration by an intramuscular injection.

In some embodiments, the composition is formulated as a liposomal composition further comprising liposomes which encapsulate the 5,6-diHETE lactone.

In some embodiments, the pharmaceutical composition is formulated for suspended or controlled release of the lactones of the invention.

The term "suspended release", "extended release", "controlled release" or "sustained release", as used herein interchangeably, refers to a mode of releasing an active agent, in this case, the lactones of the invention, from the composition comprising it gradually over a period of time. An extended release formulation of an active agent may be accomplished, e.g., by embedding the active agent in a web of substance that is slow to dissolve under certain conditions, such that the active agent slowly and regularly leeches from the coating, or by swelling up the active agent to form a gel with a nearly impenetrable surface, wherein the drug slowly exits this surface.

In some embodiments, the 5,6-diHETE lactone is at a concentration of between $10^{-9}$ M and $10^{-6}$ M in the pharmaceutical composition. In some embodiments, the 5,6-diHETE lactone is at a concentration of between $10^{-9}$ M and $10^{-7}$ M in the pharmaceutical composition.

In a second aspect, the present invention provides 5,6 dihydroxyeicosatetraenoic acid (5,6-diHETE) lactone or a pharmaceutical composition comprising it, for use in inducing vasodilation in a subject in need thereof.

As used herein, the term "a subject in need thereof" refers to any subject, particularly a mammalian subject, for whom treatment or vasodilation is needed, for example, a human individual having a condition which requires treatment by vasodilation, such as hypertension.

Inducing vasodilation may be needed in various circumstances, including treating certain diseases or disorders, e.g. diseases or disorders that involve microvascular dysfunction, as detailed below. Additional circumstances may be preventing, or reducing the risk of developing certain diseases (e.g. cardiac diseases), or ameliorating certain conditions. An example for such a use is the need to maintain a low blood pressure to reduce the risk of developing cardiac problems.

Therefore, in a third aspect, the present invention provides 5,6 dihydroxyeicosatetraenoic acid (5,6-diHETE) lactone or a pharmaceutical composition comprising it, for use in treating a disease, disorder or condition associated with microvascular dysfunction in a subject in need thereof.

The term "microvascular dysfunction" as used herein refers to a heterogeneous set of conditions affecting the function of blood vessels or resulting from the dysfunction of blood vessels and ranging from reduced organ maximal perfusion, to impaired endothelium-dependent dilation of isolated arteriole (Gutterman et al., 2016). Microvascular dysfunction is meant to also encompass undesired vasoconstriction of blood vessels.

Accordingly, in some embodiments, the composition of the invention is used for treating a disease, disorder or condition associated with vasoconstriction. In other words, the microvascular dysfunction involves vasoconstriction These treatments are effected by vasodilation induced by the composition of the invention.

The term "vasoconstriction" as used herein relates to narrowing of blood vessels resulting from contraction of the muscular wall of the vessels, in particular the large arteries and small arterioles, which increased blood pressure.

The term "Vasodilation" as used herein refers to the widening of blood vessels and is the opposite of vasoconstriction, which is the narrowing of a blood vessel. Vasodilation results from the relaxation of smooth muscle cells within the vessel walls, in particular in the large veins, large arteries, and smaller arterioles. The arterioles contribute to the majority of vascular resistance within organs and tissues.

In some embodiments, the blood vessel affected by the microvascular dysfunction, or the blood vessel in which vasodilation is induced, is an arteriole, an artery, or a vein. In some embodiments, the blood vessel is an arteriole or an artery. In some embodiments, the blood vessel is an arteriole. In some embodiments, the blood vessel is a coronary arteriole. In some embodiments, the artery or the arteriole are less than about 200 µm in diameter. In some embodiments, the blood vessel is an arteriole, having a diameter of less than about 200 µm. The blood vessel which is being dilated by the lactones of the invention may have been previously constricted, or may have been in its normal unconstricted state.

The vasodilation caused by the 5,6 diHETE lactone is likely caused by an increase in intracellular calcium level in endothelial cells which is mediated by the lactones of the invention. Accordingly, in some embodiments, the composition causes an increase in intracellular calcium level in endothelial cells.

A number of conditions are closely associated with microvascular dysfunction, including aging, amyloidosis, Chagas disease, chronic thromboembolic pulmonary hypertension, dementia, diabetes mellitus, drug abuse (such as tobacco abuse), heart failure with preserved ejection fraction (HFpEF), heart failure with reduced ejection fraction (HFrEF), hypertension, hypertrophic obstructive cardiomyopathy, idiopathic cardiomyopathy, inflammatory disease (such as inflammatory bowel disease), ischemic cardiomyopathy, no-reflow phenomenon, obesity, obstructive sleep apnea, peripheral neuropathy, schizophrenia, stress related cardiomyopathy, systemic lupus erythematosus, systemic sclerosis, tumor angiogenesis, and vasospasm.

Additional conditions associated with vasoconstriction include angina, congestive heart failure, erectile dysfunction, pre-eclampsia, migraine, stroke, and Raynaud phenomenon.

Accordingly, the composition of the invention may be used for treating microvascular dysfunction or vasoconstriction in any of the conditions listed above.

In some embodiments, the condition associated with microvascular dysfunction that may be treated by the composition of the invention is hypertension.

Hypertension, also known as high blood pressure, is a long-term (chronic) medical condition in which the blood pressure in the arteries is persistently elevated. High blood pressure typically does not cause symptoms, but long-term high blood pressure is a major risk factor for coronary artery disease, stroke, heart failure, atrial fibrillation, peripheral vascular disease, vision loss, chronic kidney disease, and dementia.

In a fourth aspect, the present invention provides 5,6 dihydroxyeicosatetraenoic acid (5,6-diHETE) lactone or a pharmaceutical composition comprising it, for use in preventing, or reducing the risk of, developing a cardiac condition associated with microvascular dysfunction in a subject at risk thereof.

Examples for a cardiac condition associated with microvascular dysfunction are angina, and congestive heart failure.

The term "a subject at risk thereof" is used herein to relate to a subject that is at a higher risk of developing a cardiac condition associated with microvascular dysfunction compared to the general population. Such a higher risk may be due to another condition from which the subject is suffering, or due to family history of the subject.

In some embodiments, the subject at risk is suffering from a disease, disorder, or condition associated with microvascular dysfunction. In some embodiments, the subject at risk has a family history of a disease, disorder, or condition associated with microvascular dysfunction. In some embodiments, the microvascular dysfunction is manifested in hypertension in the subject of family member.

Existing medications for treatment of microvascular dysfunction and specifically of hypertension belong to several groups, including diuretics (e.g. thiazides), beta-blockers (e.g. atenolol), calcium channel antagonists (e.g. dihydropyridines, phenylalkylamines, and benzothiazepines), angiotensin converting enzyme (ACE) inhibitors (e.g. benazepril, zofenopril, perindopril, trandolapril, captopril, enalapril, lisinopril, and ramipril), and angiotensin II receptor blockers (e.g. valsartan, telmisartan, losartan, irbesartan, azilsartan, and olmesartan).

In some embodiments of the above second, third and fourth aspects, as well as below aspects, the subject is non-responsive or partially responsive to at least one medication used for treating the disease disorder or condition.

In some embodiments, the subject is non-responsive or partially responsive to at least one of the existing medications for treating hypertension. In some embodiments, the subject is non-responsive or partially responsive to more than one existing medication, for example to two, three, or more existing medications for treating hypertension. In some embodiments, the subject is non-responsive or partially responsive to one group of existing medications for treating hypertension. In some embodiments, the subject is non-responsive or partially responsive to more than one group of existing medication for treating hypertension, for example to two, three, or more groups of existing medications.

The terms "non-responsive", "refractory", or "resistant" to treatment, as used herein interchangeably, mean that existing medications have no effect or a low effect, such that they do not achieve a satisfactory outcome with respect to treatment of the microvascular dysfunction or hypertension. The terms "partially responsive", "insufficiently responsive" mean that there is some effect of the existing medications but the effect is only partial and a more effective treatment is still desired.

In some embodiments, the composition of the invention is administered in combination with an additional agent for treating the disease, disorder, or condition associated with microvascular dysfunction, such as an agent for treating microvascular dysfunction or more specifically treating hypertension, or for controlling blood pressure. Such an additional agent may be selected from, for example, diuretics (e.g. thiazides), beta-blockers (e.g. atenolol), calcium channel antagonists (e.g. dihydropyridines, phenylalkylamines, and benzothiazepines), angiotensin converting enzyme (ACE) inhibitors (e.g. benazepril, zofenopril, perindopril, trandolapril, captopril, enalapril, lisinopril, and ramipril), and angiotensin II receptor blockers (e.g. valsartan, telmisartan, losartan, irbesartan, azilsartan, and olmesartan).

In some embodiments, using the composition of the invention in combination with an additional agent, as detailed above allows for using the additional agent at a lower dose, even at a sub-therapeutic dose, thereby preventing or ameliorating side effects.

The term "sub-therapeutic dose" as used herein means less than the therapeutic dose of the agent that is needed to produce a therapeutic effect when the agent is used for treating hypertension.

In a fifth aspect, the present invention further provides a method of inducing vasodilation in a subject in need thereof comprising administering to the subject a pharmaceutical composition comprising a therapeutically effective amount of 5,6 dihydroxyeicosatetraenoic acid (5,6-diHETE) lactone.

In a sixth aspect, the present invention further provides a method of treating a disease, disorder or condition associated with microvascular dysfunction comprising administering to a subject in need thereof a pharmaceutical composition comprising a therapeutically effective amount of 5,6 dihydroxyeicosatetraenoic acid (5,6-diHETE) lactone.

In a seventh aspect, the present invention provides a method of preventing, or reducing the risk of, developing a cardiac condition associated with microvascular dysfunction, comprising administering to a subject in need thereof a pharmaceutical composition comprising 5,6 dihydroxyeicosatetraenoic acid (5,6-diHETE) lactone and a pharmaceutically acceptable carrier.

The term "therapeutically effective amount" as used herein means an amount of the 5,6-diHETE lactone that will elicit the biological or medical response of a tissue, system, animal or human that is being sought, i.e. vasodilation. The amount must be effective to achieve the desired therapeutic effect as described above, depending inter alia on the type and severity of the condition to be treated and the treatment regime. The therapeutically effective amount is typically determined in appropriately designed clinical trials (dose range studies) and the person skilled in the art will know how to properly conduct such trials to determine the effective amount. As generally known, an effective amount depends on a variety of factors including the affinity of the ligand to the receptor, its distribution profile within the body, a variety of pharmacological parameters such as half-life in the body, on undesired side effects, if any, and on factors such as age and gender, etc.

The term "treating" as used herein refers to means of obtaining a desired physiological effect. The effect may be therapeutic in terms of partially or completely curing a disease, and/or symptoms attributed to the disease. The term refers to inhibiting the disease, i.e. arresting its development; or ameliorating the disease or its symptoms, i.e. causing regression of the disease.

Methods of administration include, but are not limited to, oral, parenteral, e.g., intravenous, intraperitoneal, intramuscular, subcutaneous, mucosal (e.g. intranasal, buccal, vaginal, rectal, intraocular), intrathecal, topical and intradermal routes.

The mode of administration may be systemic or local. In some embodiments, the composition is formulated for administration by an injection. In some embodiments, the composition is formulated for administration by an intravenous injection. In some embodiments, the composition is administered by an intramuscular injection.

The following exemplification of carriers, modes of administration, dosage forms, etc., are listed as known possibilities from which the carriers, modes of administration, dosage forms, etc., may be selected for use with the present invention. Those of ordinary skill in the art will understand, however, that any given formulation and mode of administration selected should first be tested to determine that it achieves the desired results.

The compositions may be formulated for parenteral administration by injection, e.g., by bolus injection or continuous infusion. Formulations for injection may be presented in unit dosage form, e.g., in ampoules or in multidose containers, with an added preservative. The compositions may take such forms as suspensions, solutions or emulsions in oily or aqueous vehicles, and may contain formulatory agents such as suspending, stabilizing and/or dispersing agents. Alternatively, the active ingredient may be in powder form for constitution with a suitable vehicle, e.g., sterile pyrogen free water, before use.

The compositions may also be formulated in rectal compositions such as suppositories or retention enemas, e.g., containing conventional suppository bases such as cocoa butter or other glycerides.

The determination of the doses of the active ingredient to be used for human use is based on commonly used practices in the art, and will be finally determined by physicians in clinical trials. An expected approximate equivalent dose for administration to a human can be calculated based on the in vivo experimental evidence disclosed herein below, using known formulas (e.g. Reagan-Show et al. (2007) Dose translation from animal to human studies revisited. The FASEB Journal 22:659-661). According to this paradigm, the adult human equivalent dose (mg/kg body weight) equals a dose given to a mouse (mg/kg body weight) multiplied with 0.081.

In some embodiments, the composition is administered in a single dose, hereinbelow referred to as "acute administration".

In some embodiments, the composition is administered in more than a single dose such as in multiple doses, for example once a day, more than once a day such as two or three times a day, or less than once a day such as once in every two days, three days, or a week. These modes of administration are referred to hereinbelow as "chronic administration".

For purposes of clarity, and in no way limiting the scope of the teachings, unless otherwise indicated, all numbers expressing quantities, percentages or proportions, and other numerical values recited herein, should be interpreted as being preceded in all instances by the term "about." Accordingly, unless indicated to the contrary, the numerical parameters set forth in this specification are approximations that may vary by up to plus or minus 10% depending upon the desired properties to be obtained by the present invention.

The invention will now be illustrated by the following non-limiting examples.

EXAMPLES

Materials and Methods

Materials 5,6 dihydroxyeicosatetraenoic acid (5,6-diHETE) lactone was purchased from Cayman Chemical of Ann Arbor, Michigan, USA (as a racemic mixture, Cat. number 18343). 5,6-diHETE (hydrolytic isomer) was purchased from Cayman Chemical of Ann Arbor, Michigan, USA (Cat. numbers 10467). 4α-phorbol-12, 13-didecanoate (4α-PDD) was purchased from mercury (Cat. numbers MBS524394). L-NAME (hydrochloride) was purchased from Cayman Chemical of Ann Arbor, Michigan, USA (Cat. numbers 80210). U-46619 was purchased from Cayman Chemical of Ann Arbor, Michigan, USA (Cat. numbers 16450). A23187 (a calcium ionophore that activates SK3 channels), and NS309 (activates IK channels) were purchase from Sigma-Aldrich.

Preparation of 5,6-diHETE Lactone

The lactone is provided in ethanol by the manufacturer. The ethanol is evaporated, and then ethanol is added to a pre-determined volume. HEPES buffer is next added to obtain the final desired concentration of the lactone. The ethanol concentration in the final solution is ≤1.6%.

Cell Culture

Human umbilical vein endothelial cells (HUVECs) were extracted from umbilical cords provided by Padeh-Medical Center in Poriah (Helsinki approval #0100/14). The umbilical cords were washed with PBS, and the cells were disconnected by collagenase and maintained in a full-growth medium (EGM-2, Lonza) as previously described (Levi-Rosenzvig et al., 2017). HUVECs were obtained from different batched of extractions and were cultured in a humidified 37° C., 5% $CO_2$ incubator, split at 90-95% confluence, and used between passage 5-8.

HEK293 cells (ATCC, Manassas, VA) were cultured in Dulbecco's Modified Eagle Medium/Nutrient Mixture F-12 (D-MEM/F-12) supplemented with 10% fetal bovine serum, 100 U/mL penicillin G sodium, 100 µg/mL streptomycin sulfate, and selection antibiotics.

CHO cells (ATCC, Manassas, VA) were cultured in Ham's F-12 supplemented with 10% fetal bovine serum, 100 U/mL penicillin G sodium, 100 µ/mL streptomycin sulfate and appropriate selection antibiotic.

Transfection

Potassium channels genes were expressed in HEK293 or CHO cells (see Table 1). SspI or PvuI enzymes were used to linearize pcDNA3.1 plasmid (Thermo Fisher). The plasmid was stably transfected by Lonza Nucleofector. The transfection efficiency was >80% as validated by expression (western blot) and activation (patch clamp and membrane potential detection) of the channels.

and incubated for 40 min at 37° C. in complete medium that contained 20% pluronic acid. After washing twice with HEPES buffer that contained (in mmol/L) 1.25 $CaCl_2$, 5.5 D-glucose, 10 HEPES, 5 KCl, 0.5 $MgCl_2$, and 140 NaCl (brought to pH 7.4 with NaOH); the plates were incubated at 37° C. for 15 additional minutes prior to fluorescence imaging. Fluorescence images were acquired every 1 s over the course of 5 min in cells treated with 4α-phorbol-12,13-didecanoate (4α-PDD; a specific TRPV4 agonist; 10 µmol/L), 5,6-diHETE ((±)5,6-dihydroxy-8Z,11Z,14Z,17Z-eicosatetraenoic acid) 1, 5 lactone (0.01-5 µmol/L) and 5,6-diHETE (hydrolytic isomer of 5,6-EEQ; 2 and 5 µmol/L). The calculated ratio between maximal intensity (F1) and basal intensity (F0) was determine for each experiment and presented as Average±SD.

Experimental Animals

C57BL/6J male mice (3-6-month-old obtained from Harlan labs (now Envigo) had free access to water and food, and treated in accordance with the National Council for Animal Experimentation (#IL-17-14-138).

Vascular Reactivity in Mouse Vessels

On the day preceding the experiment, adult male mice (age 3-6 months) were decapitated and mesenteric tissue was dissected and placed on an agar plate with ice-cold HEPES-physiological saline solution (PSS) containing: 123 mM NaCl, 4.7 mM KCl, 2.5 mM $CaCl_2*2H_2O$, 1.2 mM

TABLE 1 calcium and potassium channels expression systems

| Gene | GenBank accession number | Channel | Vector | Transfection | Cells |
|---|---|---|---|---|---|
| KCNN3 | NM_002249.4 | SK3 (KCa2.3) | pcDNA3.1 | Stable | HEK293 |
| KCNN4 | NM_002250.2 | IK | pcDNA3.1 | Stable | CHO |
| TRPA1 | NM_007332.2 | TRPA1 | pcDNA4/TO | Stable | CHO |
| hTRPV4 | NM_021625.3 | TRPV4 | pcDNA4/TO | Stable | CHO |
| TRPC3 | NM_001130698.1 NM_003305.2 | TRPC3 | pcDNA4/TO | Stable | HEK293 |
| TRPV3 | NM_145068.2 | TRPV3 | pcDNA4/TO | Transient | HEK293 |

Potassium Channel Activity

Functional activity of voltage-gated potassium channels was conducted using a potassium dye (Thallium flux assay, Molecular Devices) using a Fluorescence Imaging Plate Reader (FLIPRTETRA™) instrument, according to the manufacturer's instructions. Cells were plated in 384-well black wall, flat clear bottom microtiter plates (BD Biocoat Poly-D Lysine Multiwell Cell Culture Plate) at 15,000 to 30,000 cells per well. Cells were incubated at 37° C. overnight or until cells reach sufficient density in the wells (near confluent monolayer) to use in fluorescence assays. A typical sequence is to record a baseline during the pre-incubation period (first addition of test article before stimulation), followed by activation in the stimulus buffer. For each addition, the first 60 seconds of data are acquired at the maximum rate (1 sample/second) and for the remaining 9-19 minutes (depending on the recording time of each addition); data are sampled every 5 seconds.

Calcium Imaging

HUVECs were plated onto 24-well plates and grown to 70% confluence. To monitor cytosolic $Ca^{2+}$ signals, cells were loaded with fluo-3 AM (4 µmol/L; Molecular Probes)

$MgSO_4*7H_2O$, 20 mM $NaHCO_3$, 1.2 mM $KH_2PO_4$, 26 µM EDTA, 11 mM glucose and 2.38 mg/ml HEPES Fat and connective tissue were carefully removed, arterioles (150-200 µm diameter) were cut into 3 mm segments and stored overnight at 4° C. The vessels were then mounted carefully on two tungsten wires (0.025 mm diameter) with care not to damage the endothelium, and mounted on a four-chamber wire myograph (DMT, Denmark, Model 620 M). Arteries were then equilibrated at 37° C. for 30 min in the myograph chamber filled with PSS and constantly bubbled with gas containing 21% $O_2$, 74% $N_2$, and 5% $CO_2$ and set at 1 mN resting tension obtained in the LabChart Pro software (AD instruments, Oxfordshire, UK). Arteries were stimulated twice before initiation of experimental protocols; first with KCl (127 mM) and second with the thromboxane mimetic U-46619 (100 nM) for 5 min and 10 min, respectively. Arteries that did not show values of at least 2 mN in the contraction were discarded. After contraction reached steady state, cumulative concentrations of 5,6-diHETE lactone were added (1 µM to 10 µM) in DMSO (up to 0.16%) and the % relaxation responses were determined relative to the relaxation response to 100 µM papaverine.

Human Subjects (from Whom the Vessels were Extracted)

TABLE 2

| characterization of subjects | |
|---|---|
| Sex (M/F) | 6/11 |
| Age, years (average ± SEM) | 54.3 ± 3.62 |
| BMI (Average ± SEM) | 28.01 ± 0.84 |
| BMI ≥30 | 3/18 |
| Underlying diseases/risk factor: | |
| Coronary Artery Disease (CAD) | 0 |
| Hypertension (HTN) | 9 |
| Hypercholesterolemia (HL) | 2 |
| Diabetes Mellitus (DM) | 4 |
| Congestive Heart Failure (CHF) | 0 |
| None of the Above | 6 |

Statistical Analysis

The results are reported as mean±standard error. The statistical analysis was performed using One-way ANOVA with Tukey's post hoc test, Letters represent a significant difference between the different concentrations and the asterisks represent a significant difference from the negative control. P-value of 5% or less is considered statistically significant. The data were analyzed using GraphPad Prism 5 software.

Example 1: 5,6-diHETE Lactone Mediates Intracellular $[Ca^{2+}]$ Increase

To investigate the effect of 5,6-diHETE ((±)5,6-dihydroxy-8Z,11Z,14Z,17Z-eicosatetraenoic acid) lactone on cytosolic $[Ca^{2+}]i$ (FIG. 1), HUVECs were exposed to graded doses of 5,6-diHETE lactone (0.01-5 µmol/L) in ethanol/HEPES buffer, and the intracellular changes in $[Ca^{2+}]$ were determined by the mean of fluoresces intensity. Results showed that cytosolic $[Ca^{2+}]i$ increased in response to 5,6-diHETE lactone in a dose dependent manner up to 0.1 µM. No significant differences in cytosolic $[Ca^{2+}]i$ levels were detected beyond 0.5 µM lactone. Above this concentration the cytosolic $[Ca^{2+}]i$ levels reach saturation.

CYP metabolites are esterified into phospholipids or are hydrolyzed by soluble epoxide hydrolase (sEH) into the less active forms dihydroxyeicosatrienoic acids [DHETs]). These rapid pathways result in the reduction of epoxide concentrations, and thus, in a decrease in their activity. We therefore tested the ability of the hydrolyzed form compared to the unhydrolyzed form to increase intracellular calcium (FIG. 2). Results showed changes in cellular $[Ca^{2+}]i$ in HUVEC induced by 2 µmol/L of 5,6-diHETE lactone but not by 2 µmol/L of the hydrolytic isomer 5,6-diHETE.

Example 2: 5,6-diHETE Lactone Mediates Dilation in Resistance Arteries

Figure 3:
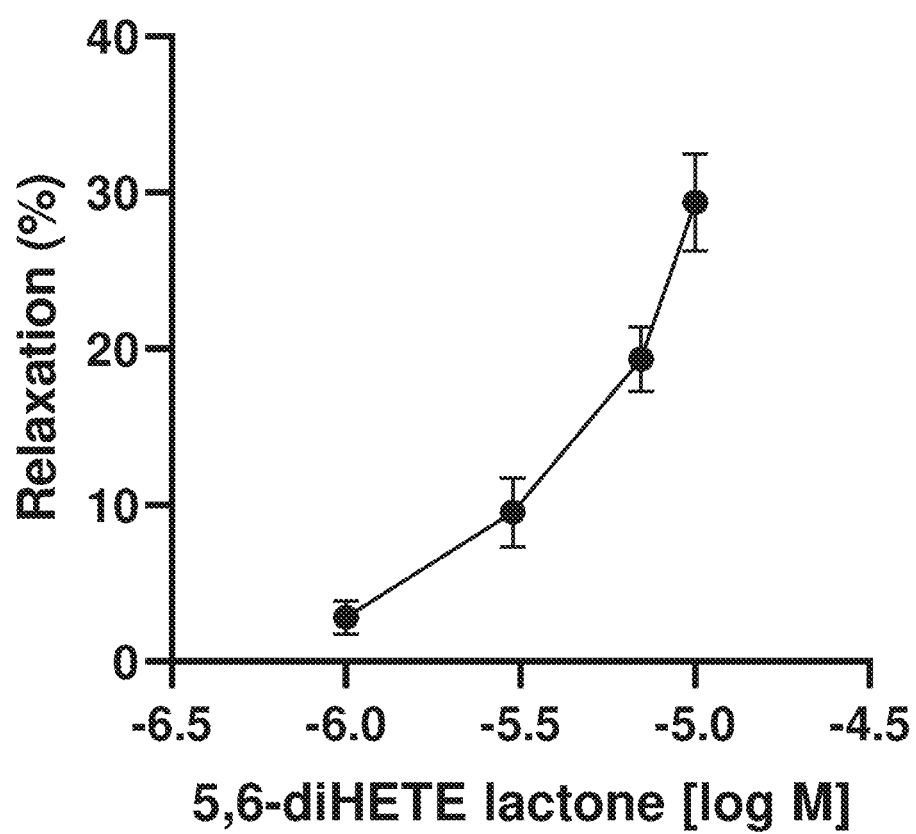
FIG. 3 shows that 5,6-diHETE lactone mediates dilation in mouse mesenteric resistance arteries. Cumulative dilation response curves to increasing concentrations of 5,6-diHETE lactone after constricting with 0.1 μM U46619 (a stable synthetic analog of the $PGH_2$, acts as a thromboxane $A_2$ (TP) receptor agonist) are shown. Data shown are mean % relaxation in vessels tension (mN±SEM) (determined relative to the relaxation response to 100 μM papaverine) from 11 arteries in 4 independent experiments.

To evaluate the vasodilation mediated by 5,6-diHETE lactone, mesenteric arteries from C57BL were extracted and monitored for their dilation in a wire myograph chamber under physiological conditions. The arteries were pre-constricted with the thromboxane mimetic U-46619 (0.1 µmol/L), followed by exposure to 5,6-diHETE lactone (1-10 µmol/L). The results (FIG. 3) show that 5,6-diHETE lactone mediates concentration-dependent vasodilation (up to 29.4±3.1% dilation at $10^{-5}$ mol/L; n=11) in mouse mesenteric arteries.

Example 3: 5,6-diHETE Lactone Induced Dilation in Human Arterioles

Human adipose arterioles (HAAs) were extracted from adipose tissues obtained from subjects without coronary artery disease (7 normotensives and 7 hypertensives). The HAAs (100-200 µm in diameter) were cannulated with 2 glass micropipettes in an organ chamber, and the internal diameter of arterioles was measured with a video system. Arterioles were pre-constricted with endothelin-1 (10-50 nmol/L) to reduce the passive diameter by 30-50%. Relaxation was measured in response to the increasing concentrations of 5,6-diHETE lactone ($10^{-4}$-$10^{-1}$ µmol/L). To examine the involvement of NO in the 5,6-diHETE lactone-induced dilation, relaxation responses were determined in the presence or absence of nitric oxide synthase (NOS) antagonist (100 µmol/L N[omega]-nitro-Larginine methyl ester [L-NAME]).

Figure 4:
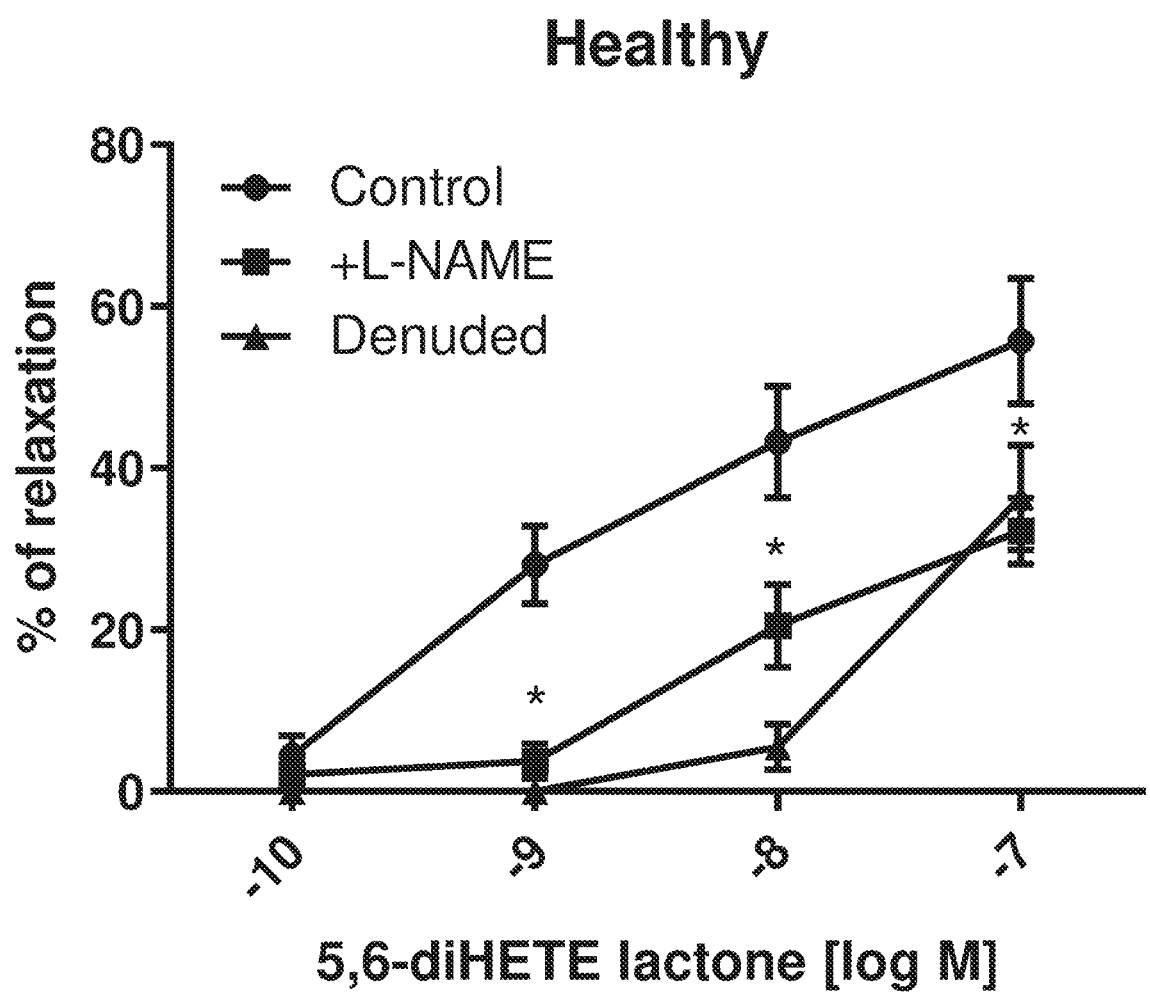
FIG. 4 shows relaxation (dilation) of healthy adipose arterioles mediated by 5,6 diHETE lactone. Cumulative dilation response curves to 5,6-diHETE lactone ($10^{-4}$-$10^{-1}$ μmol/L) after constricting with endothelin-1 (10-50 nmol/L) are shown ("Control", circles). Administration of L-NAME (an inhibitor of nitric oxide synthase, 100 μmol/L) reduced this effect by 50% (squares). Mechanical denudation of the endothelial layer significantly reduced the 5,6 diHETE lactone-induced dilation (triangles). Data shown are mean % relaxation in vessels tension (mN±SEM) (determined relative to the relaxation response to 100 μM papaverine) from 7 arteries.

FIG. 4 shows that 5,6-diHETE lactone produced a concentration-dependent vasodilation in normotensive subjects (max dilation at $10^{-7}$ mol/L=58.6%, n=5), and that administration of L-NAME) reduced this effect by 50%, implying that the activity of the 5,6-diHETE lactone in normotensive subjects was not completely dependent on NO. However, mechanical denudation of the endothelial layer significantly reduced the 5,6 DiHETE lactone-induced dilation, indicating an endothelial-dependent mechanism for 5,6 DiHETE lactone-induced dilation.

Endothelial cell denudation was achieved by perfusion of the vessels with pre-warmed air as previously described (H. Miura, Circ. Res. 92 (2003)). At the end of each experiment, papaverine (100 µmol/L), an endothelium-independent vasodilator, was added to determine the maximal dilation for normalization of dilator responses. Vasodilator responses are expressed as the percentage of maximal dilation, with 100% representing complete relaxation (maximal diameter).

Figure 5:
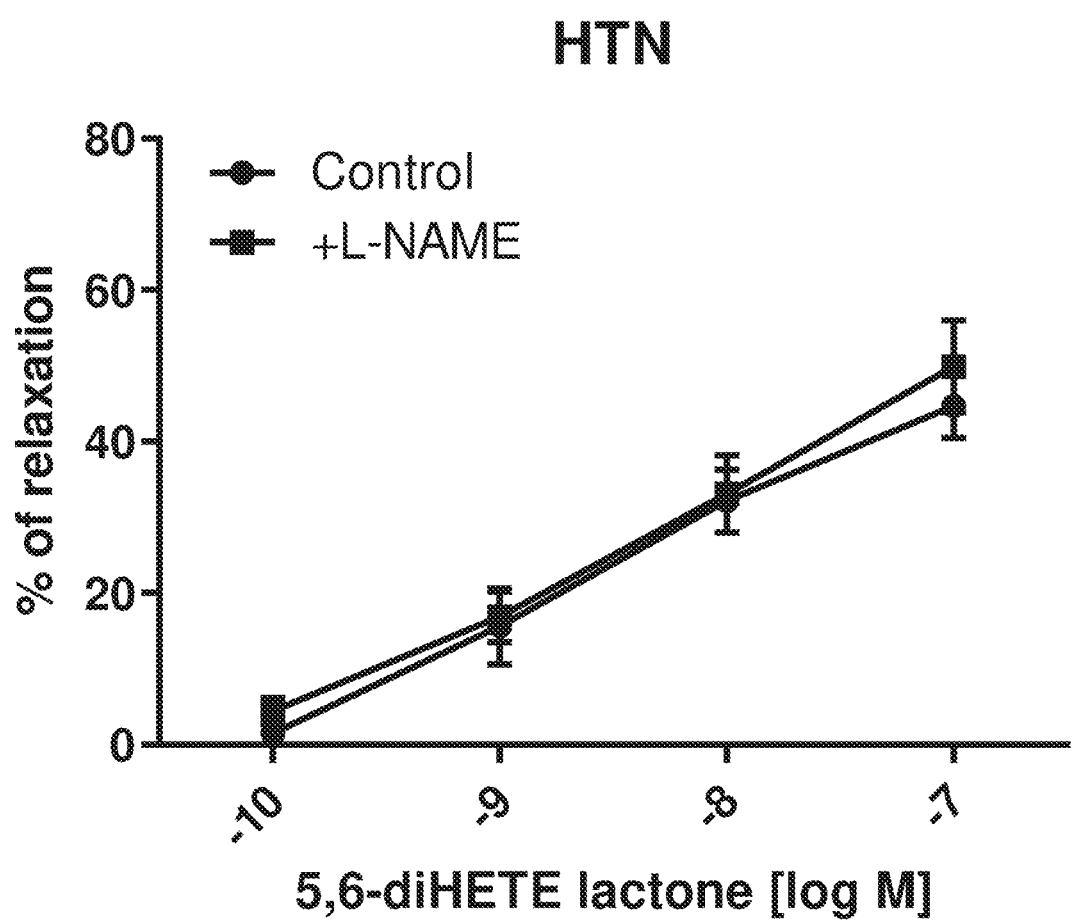
FIG. 5 shows relaxation (dilation) of adipose arterioles of hypertensive subjects (HTN) mediated by 5,6 diHETE lactone. Cumulative dilation response curves of 5,6-diHETE lactone ($10^{-10}$-$10^{-7}$ mol/L) after constricting with endothelin-1 (10-50 nmol/L) are shown (circles). Administration of L-NAME had no effect (squares). Data shown are mean % relaxation in vessels tension (mN±SEM) (determined relative to the relaxation response to 100 μM papaverine) from 7 arteries.

FIG. 5 shows that 5,6-diHETE lactone produced a concentration-dependent vasodilation in hypertensive subjects (max dilation at $10^{-7}$ mol/L=40.9%, n=5), and that administration of 100 µmol/L L-NAME had no effect, implying that the activity of the 5,6-diHETE lactone in hypertensive arteries is completely independent on NO. This last result may have to do with that in hypertensive subjects the NO-signaling pathway may be compromised and its bioavailability reduced, and endothelium-dependent dilation is often maintained by compensatory generation of EETs or $H_2O_2$ (Freed and Gutterman 2017).

Example 4: Agonist Effect of 5,6-diHETE Lactone on Potassium Channels

Stimulation of calcium-activated potassium ($K_{Ca}$) channels to hyperpolarize the endothelial cells is a prerequisite to obtain the endothelium-dependent hyperpolarization of the underlying vascular smooth muscle. Demonstration of endothelial SK ($K_{Ca}2.3$) and IK ($K_{Ca}3.1$) activation is considered critical to the accepted definition of endothelial-derived hyperpolarizing factors (EDHF), which acts to preserve arterial relaxation in hypertension.

Accordingly, the objective of this study was to evaluate the agonist effects in vitro of the 5,6-diHETE lactone on two cloned human channels stably expressed in HEK-293 or CHO cells. The assay was performed with a thallium flux assay (FLIPR® Potassium Assay, Molecular Devices) according to the manufacturer's instructions. Briefly, cells were plated in 384-well black wall, flat clear bottom microtiter plates (BD Biocoat Poly-D-Lysine Multiwell Cell Culture Plate) at 15,000 to 30,000 cells per well. Cells were incubated at 37° C. overnight or until cells reach sufficient density in the wells (near confluent monolayer) to use in fluorescence assays. Dye-loading: Growth medium was removed and replaced with dye-loading buffer for 60 minutes at room temperature (protected from light). Agonist Effect: 5 repetitions of (5 µL) test, and vehicle or control solutions (assay buffer=0.3% DMSO) in K$^+$-free buffer with 5 mM Tl$^+$ was added to each well for ~5 minutes. The test was 5,6-diHETE lactone (at eight concentrations: 0.05, 0.15, 0.3, 0.65, 1.25, 2.5, 5, and 10 µM, n=4). The agonist effects of the test article on the potassium channels was evaluated during this period by using a Fluorescence Imaging Plate Reader (FLIPRTETRA™) instrument.

To calculate the effect, the signal elicited in the presence of a known agonist, (1 µM A-23187 for SK3 and 10 µM NS309 for IK) with 5 mM thallium was set to 100% activation and the signal in the presence of the vehicle control (assay buffer+0.3% DMSO) was set to 0% activation. EC50 was calculated using GraphPad prism 5 software using nonlinear regression fit formula assuming a simple binding model.

TABLE 3

Figure 6A:
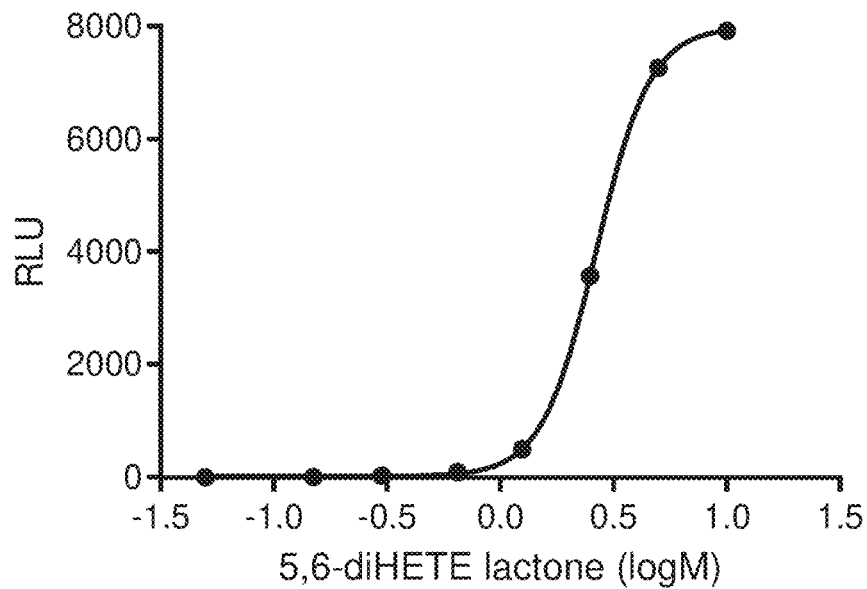
FIGS. 6A-6B show the agonist effect of 5,6-diHETE lactone on calcium-activated potassium channels. $K_{Ca}3.1$ (IK, A) calcium-activated potassium channel (encoded by the human KCNN4 gene) expressed in CHO cells; and $K_{Ca}2.3$ (SK3, B) calcium-activated potassium channels (encoded by the human KCNN3 gene) expressed in HEK293 cells. The assay was performed with a thallium flux assay (Molecular Devices) according to the manufacturer's instructions. The agonist effects of 5,6-diHETE lactone was evaluated at eight test concentrations (0.05, 0.15, 0.3, 0.65, 1.25, 2.5, 5, and 10 μM, n=4). To calculate the effect, the signal elicited in the presence of a known agonist, (1 μM A-23187 for SK3 and 10 μM NS309 for IK) with 5 mM thallium was set to 100% activation and the signal in the presence of the vehicle control (assay buffer+0.3% DMSO) was set to 0% activation. EC50 was calculated using Graph-Pad prism 5 software using nonlinear regression fit formula assuming a simple binding model, and was 2.654 for the IK channel, and 9.991 for the SK3 channel. Effect was considered significant if the mean value was three or more standard deviations above the vehicle control mean. RLU—relative units.

Agonist effect of 5,6-diHETE lactone on IK Channels (FIG. 6A).

| Test Article ID | Test Conc. (µM) | Normalized % Activation | SD |
| --- | --- | --- | --- |
| (±)5,6-diHETE lactone | 0.05 | −0.13 | 0.06 |
| | 0.15 | −0.03 | 0.06 |
| | 0.3 | 0.2 | 0.07 |
| | 0.65 | 1.03 | 0.26 |
| | 1.25 | 6.06 | 1.96 |
| | 2.5 | 44.2 | 3.19 |
| | 5 | 90 | 2.13 |
| | 10 | 98.19 | 3.24 |

Effects were considered significant if the mean value was three or more standard deviations above the vehicle control mean. 3×SD of vehicle (0.3% DMSO in assay buffer) mean=7.73; values >7.73 were considered significant (highlighted in bold).

TABLE 4

Figure 6B:
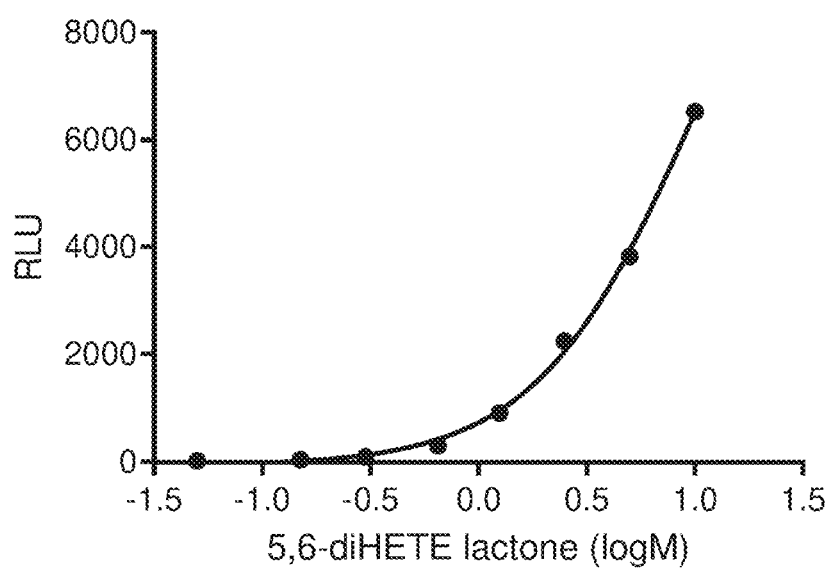

Agonist effects of 5,6-diHETE lactone on SK3 Channels (FIG. 6B).

| Test Article ID | Test Conc. (µM) | Normalized % Activation | SD |
| --- | --- | --- | --- |
| (±)5,6-diHETE lactone | 0.05 | 0.12 | 0.05 |
| | 0.15 | 0.35 | 0.11 |
| | 0.3 | 0.95 | 0.09 |
| | 0.65 | 3.25 | 0.10 |
| | 1.25 | 10.16 | 0.89 |
| | 2.5 | 25.36 | 0.64 |
| | 5 | 43.17 | 1.72 |
| | 10 | 73.65 | 2.19 |

Effects were considered significant if the mean value was three or more standard deviations above the vehicle control mean. 3×SD of vehicle (0.3% DMSO in assay buffer) mean=0.41; values >0.41 were considered significant (highlighted in bold).

Example 5: 5,6-diHETE Lactone Induces Vascular Dilation Via Endothelial Calcium-Activated Potassium ($K_{Ca}$) Channels 5/6 rat Nephrectomy model (5/6Nx)—All animal experiments were conducted according to the institutional animal ethical committee guidelines, which conform to the Guide for the Care and Use of Laboratory Animals published by the US National Institutes of Health (Eighth edition 2011) (Ethics #: 26-04-2016). In this research, we used 250-300 gr Sprague-Dawley male rats. The animals maintained at the institutional Experimental Surgical Unit and were fed on normal rodent chow diet, with tap water ad libitum. The rats were housed at a constant temperature and relative humidity under a regular light/dark schedule (12:12).

Hypertension was induced using the 5/6Nx model, as previously described (M. Verkaik, et al., Physiol. Rep. 6 (2018) 1-13). Briefly, under 87 mg/kg ketamine and 13 mg/kg xylazine anesthesia (intramuscular), subtotal renal ablation was performed by complete occlusion of the right renal artery and vein. Subsequently, ⅔ of the left kidney was infarcted by ligating 2 branches of the left renal artery, resulted in ischemia of ⅚ of the rat's nephrons i.e. 5/6Nx. At the end of the procedure, abdominal muscles and skin were sutured, and the animal returned to its cage for recovery.

Blood pressure was monitored in conscious rats by a validated tail-cuff plethysmography method using the CODA non-invasive blood pressure NIBP system (Kent Scientific Corporation, Torrington CT, USA).

Male Sprague-Dawley rats (300-350 gr) were deeply anesthetized with ketamine (87 mg/kg) xylazine (13 mg/kg). Intact $2^{nd}$ or $3^{rd}$ order branches of mesenteric arteries (250-300 µm) were obtained, and fat and connective tissue were carefully removed. The arteries were then stored overnight in cold (4° C.) physiological saline solution (PSS-HEPES) containing the following (in mmol/L): 123 mM NaCl, 4.7 mM KCl, 2.5 mM $CaCl_2$*$2H_2O$, 1.2 $MgSO_4$*$7H_2O$, 20 mM $NaHCO_3$, 1.2 mM $KH_2PO_4$, 0.026 mM EDTA, 11 mM glucose, and 2.38 mg/ml HEPES, pH 7.4. The vessels were cut into segments (2 mm long), with care not to damage the endothelium, placed on 2 tungsten wires (25 m diameter), and mounted on a 4-chamber wire myograph (model 620M; Danish Myo Technology). Arteries were then equilibrated at 37° C. for 30 min in the myograph chamber filled with PSS and constantly bubbled with gas containing 21% $O_2$, 74% $N_2$, and 5% $CO_2$ and set at 2 mN resting tension. Arteries were stimulated twice before initiation of experimental protocols; first with KCl (60 mmol/L) and second with the thromboxane mimetic U-46619 (100 nmol/L) for 5 min each. In order to examine the endothelium function, the second contraction followed by dilation with acetylcholine (100 nmol/L) and then reached to maximal dilation with papaverine (100 µmol/L). After 30 min rest, the arteries were re-constricted by U-46619 (100 nmol/L), followed by addition of 5,6-diHETE lactone (in cumulative doses of 0.01-5 µmol/L). % relaxation responses were determined relative to the relaxation response to 100 µmol/L papaverine. Inclusion criteria for the arteries in all the experiments included contraction >3 mN in respond to U-46619 and KCl and dilation >50% with Ach. $K_{Ca}$ channels were inhibited by apamin (SKCa blocker, 1 µmol/L) and TRAM-34 (IKCa blocker, 1 µmol/L) that were added to the bath 20 min before constriction with U-46619.

Figure 7A:
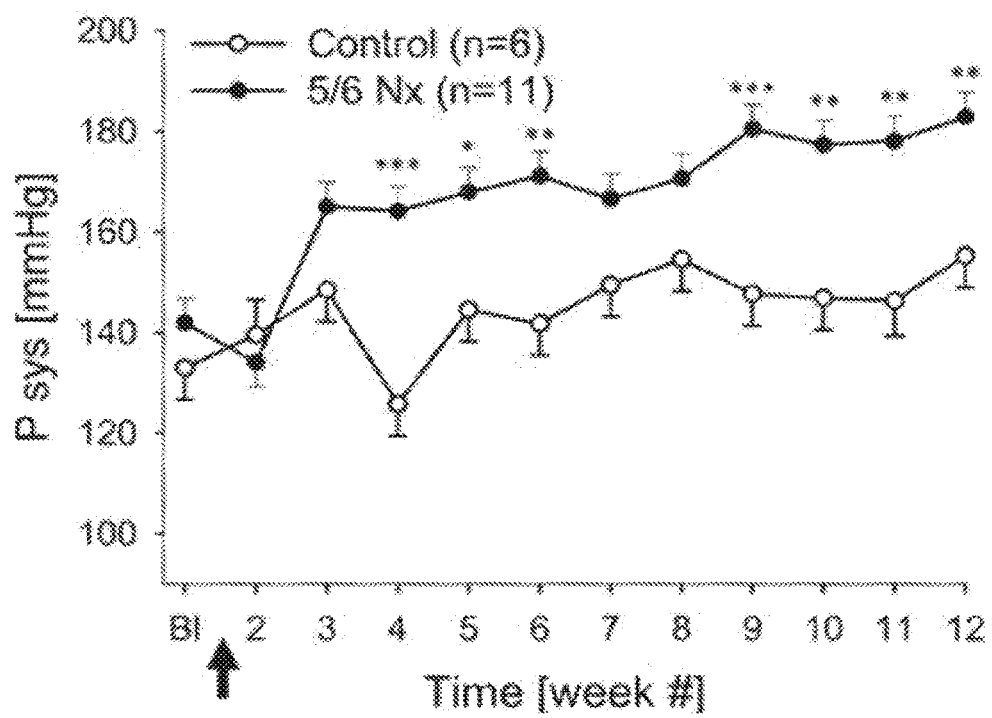
FIGS. 7A-7D show 5,6-diHETE lactone induced vascular dilation in an HTN 5/6Nx rat model via endothelial KCa channels. 5,6-diHETE lactone relaxation effects were evaluated in mesenteric arteries extracted from 5/6Nx rats. A. 2 weeks post 5/6Nx procedure (black arrow) systolic blood pressure (P sys) abruptly increases and further gradually increases from week 4 to 12 weeks, reaching statistical significance (*p<0.05) in the $4^{th}$ week. Control (Open circles), 5/6Nx (filled circles). Mesenteric arteries from NT (normotensive, wild type) rats vs. 5/6Nx rats were isolated and measured for their relaxation response to acetylcholine—ACh (B) or 5,6-diHETE lactone (C) or 5,6-diHETE lactone (1 μmol/L) in the absence (−inhibitor) or the presence of TRAM-34 (1 μmol/L) and apamin (1 μmol/L) (+inhibitor) (D). Data shown are changes in vessel tension (mN±SD) from 3-4 independent experiments with 7 (NT), and 13 (5/6Nx) arteries. **indicates p<0.01, significant was assessed by Wilcoxon T-test.
Figure 7B:
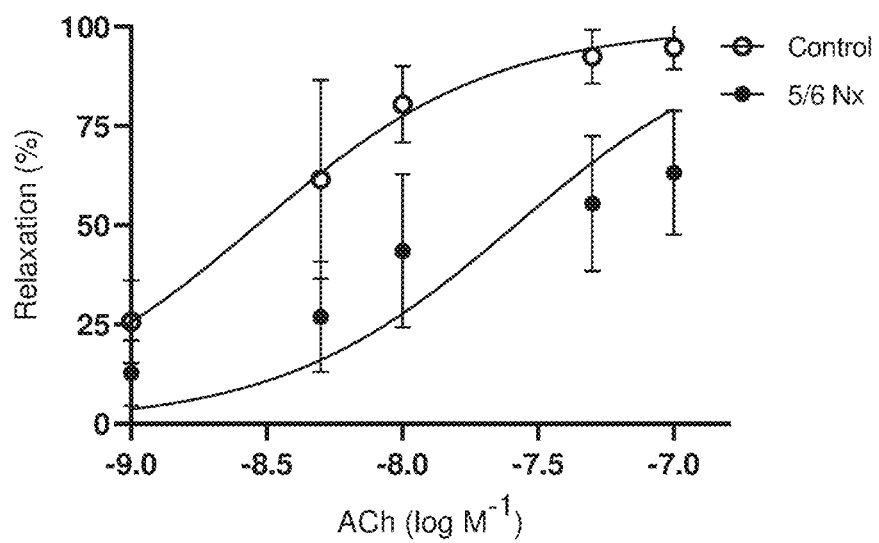
Figure 7C:
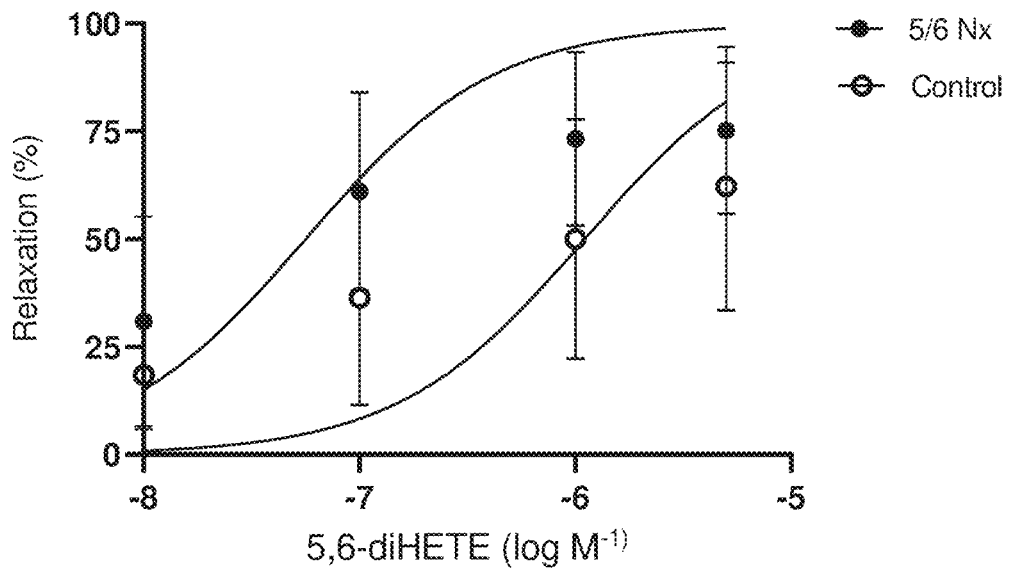
Figure 7D:
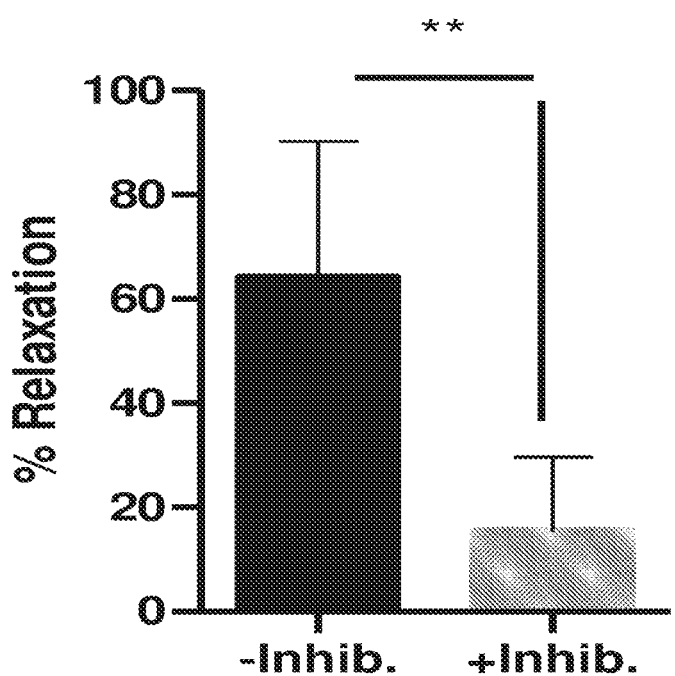

5,6-diHETE lactone relaxation effects were evaluated in mesenteric arteries extracted from 5/6Nx rats. As can be seen from FIGS. 7A-7D: FIG. 7A shows an increase in 5/6Nx blood pressure, which indicates the development of kidney dysfunction and HTN. The systolic blood pressure increased within 2 weeks post-operation by 30 mmHg (reaching 165±5 mmHg) and gradually increased over 12 weeks to 183±5 mmHg. Thereafter, mesenteric arterioles, ($2^{nd}$ order, <200 µm in diameter) extracted from the rat's model (NT and 5/6Nx), were tested for their dilation response to increasing concentrations of acetylcholine (FIG. 7B) or 5,6-diHETE lactone (FIG. 7C). Acetylcholine induced significantly (<0.05%) higher relaxation of NT vessels vs. 5/6Nx vessels, reaching 94.8±5.5% vs. 63.2±15.6% relaxation (n=7-13), respectively, while 5,6-diHETE lactone induced higher relaxation of 5/6Nx vessels reaching 73.3±20.2% relaxation vs. NT vessel relaxation (58.6±25.0%) at $10^{-6}$M (n=11). Pre-treatment with TRAM-34 and apamin, (IKCa and SKCa blocker, respectively), significantly attenuated the 5,6-diHETE lactone-induced relaxation (p<0.01, FIG. 7D).

Example 6: Acute (Single) Administration of 5,6-diHETE Lactone Reduces Hypertension In Vivo Direct blood pressure measurements—For direct blood pressure (BP) evaluation, Sprague-Dawley 5/6Nx rats were deeply anesthetized by an injection of 87 mg/kg ketamine and 13 mg/kg xylazine (intramuscular) mixture. Next, the rats were instrumented with a venous line and an arterial line. Specifically, using 26G i.v. cannula (BD Neoflon, Helsinborg, Sweden) we punctured one of the tail veins, and installed the cannula. Next, 1 ml of saline heparin (500 IU/ml) mixture was administered to avoid blood clotting. Concomitantly, we installed the arterial line, after a neck incision we bluntly exposed the right carotid and ligated it distally. Then the artery was clamped proximally and incised between the ligation and the clamp. A 100 PE tube was advanced into the artery and tightened in it by second ligature aimed to avoid blood leakage, and then we removed the arterial clamp. The external tube was attached to a Luer stopcock valve, through which saline could be injected, blood withdrawn and to be connected to a pressure transducer.

Upon connecting and stabilization, signals were continuously sampled at a sampling rate of 200 samples/sec by the MPVS-300 system, recorded. The data was displayed and recorded on a personal computer by the PowerLab System and Chart5 software (AD Instruments, Colorado Springs, CO, USA).

Basal BP was recorded for 10 min, after which time 0.5 ml 5,6-diHETE lactone (0.3 mg/kg and 3 mg/kg) dissolved in saline+DMSO (9:1) were injected through the venous line, and BP was recorded for additional 10 min after injection. For control, two distinct, known BP lowering agents were used consecutively, labetalol (10 mg/kg) a known a and p adrenergic inhibitor, and amlodipine (1.5 mg/kg) a calcium channel blocker (each by 0.5 ml venous injection). BP was recorded for additional 10 min after each injection. Specifically, after lactone effect recording labetalol was administered and 10 min later the amlodipine. We terminated the experiment by venous administration of 1M KCl overdose, until the heart stopped.

Figure 8A:
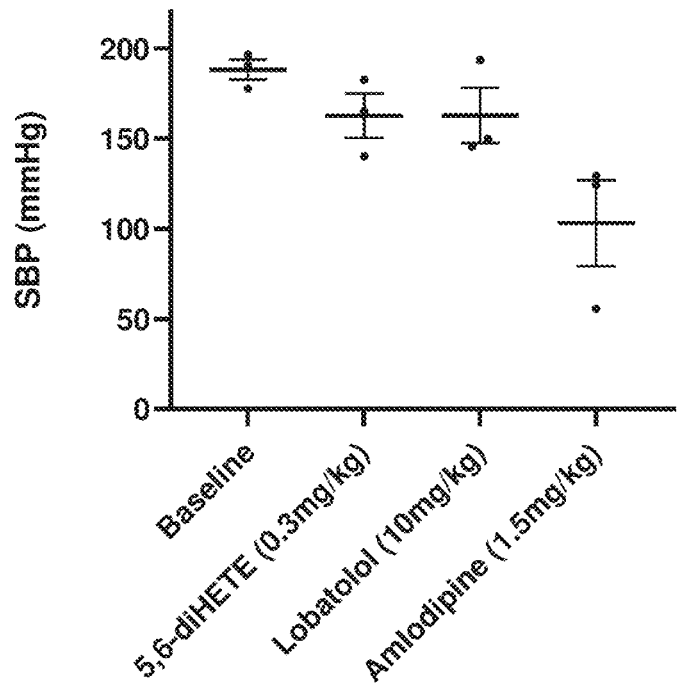
FIGS. 8A-8B show the effect of a single (acute) 5,6-diHETE lactone administration on systolic blood pressure (SBP). A. Changes in systolic blood pressure (SBP) following an injection of 0.3 mg/kg 5,6-diHETE lactone in comparison with baseline, labetalol, and amlodipine. B. The percentage reduction of SBP from baseline following injection the 5,6-diHETE lactone injection. The results are presented as average with standard error based on 3 rats.
Figure 8B:
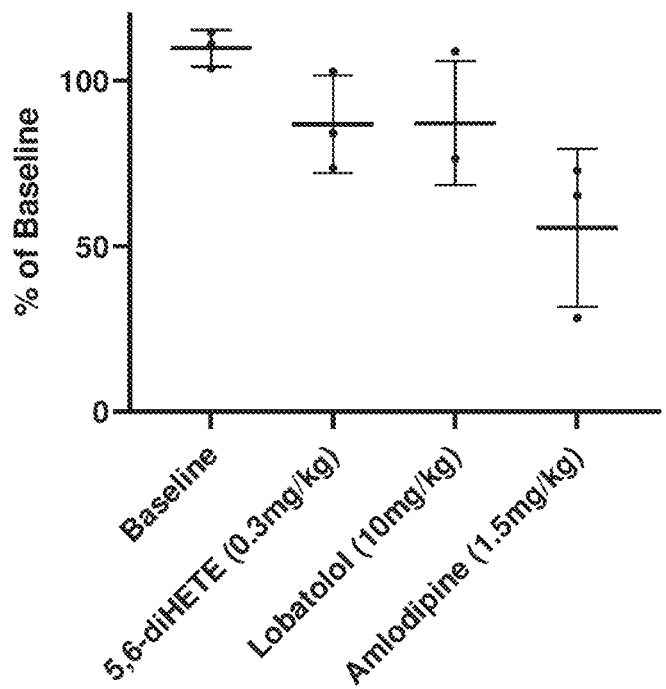

As can be seen from FIGS. 8A and 8B, a decrease in systolic blood pressure (SBP) was demonstrated upon injection of 0.3 mg/kg 5,6-diHETE lactone (162.5±12.3 mmHg) in comparison with the baseline (188.0±5.5 mmHg). This effect was similar to the labetalol-induced SBP reduction, although the labetalol was used at a higher concentration (10 mg/kg). As can be seen from FIG. 8B, the percent reduction of SBP from baseline upon injection of 5,6-diHETE lactone or of labetalol was about 20%.

Example 7: Chronic Administration of 5,6-diHETE Lactone Reduce Hypertension In Vivo Sprague-Dawley 5/6Nx rats are administered with 5,6-diHETE lactone by an intravenous injection once daily for 5 days. The rats are then monitored for changes in blood pressure and evaluated for kidney function by blood and urine chemistry. Data is taken at three-time points: 0 (before nephrectomy), after treatment with the lactone (at the end of the 5-days injections), and after another week of wash-out.

REFERENCES

Eryanni-Levin S, Khatib S, Levy-Rosenzvig R, Tamir S, Szuchman-Sapir A. 5,6-delta-dhtl, a stable metabolite of arachidonic acid, is a potential substrate for paraoxonase 1. Biochim Biophys Acta. 2015:1851:1118-1122.

Freed J K, Gutterman D D. Communication is key: Mechanisms of intercellular signaling in vasodilation. Journal of cardiovascular pharmacology. 2017:69:264-272.

Fulton D, et al. A method for the determination of 5,6-eet using the lactone as an intermediate in the formation of the diol. J Lipid Res. 1998:39:1713-1721.

Gutterman et al., 2016, The Human Microcirculation—Regulation of Flow and beyond, Circ Res. 118(1): 157-172.

Imig J D. Epoxyeicosatrienoic acids, 20-hydroxyeicosatetraenoic acid, and renal microvascular function. Prostaglandins & other lipid mediators. 2013:104-105:2-7.

Kujal P, et al. Inhibition of soluble epoxide hydrolase is renoprotective in 5/6 nephrectomized ren-2 transgenic hypertensive rats. Clinical and experimental pharmacology & physiology. 2014:41:227-237.

Lai L H, et al. Effects of docosahexaenoic acid on large-conductance ca2+-activated k+ channels and voltage-dependent k+ channels in rat coronary artery smooth muscle cells. Acta pharmacologica Sinica. 2009:30:314-320.

Levi-Rosenzvig R, Beyer A M, Hockenberry J, Ben-Shushan R S, Chuyun D, Atiya S, Tamir S, Gutterman D D, Szuchman-Sapir A. 5,6-delta-dhtl, a stable metabolite of arachidonic acid, is a potential EDHF that mediates microvascular dilation. Free Radic Biol Med. 2017:103: 87-94.

Marowsky A, et al. Distribution of soluble and microsomal epoxide hydrolase in the mouse brain and its contribution to cerebral epoxyeicosatrienoic acid metabolism. Neuroscience. 2009:163:646-661.

Qin J, et al. Inhibition of soluble epoxide hydrolase increases coronary perfusion in mice. Physiological reports. 2015:3.

Yang W, et al. Stable 5,6-epoxyeicosatrienoic acid analog relaxes coronary arteries through potassium channel activation. Hypertension. 2005:45:681-686.

Zeldin D C, et al. Regio- and enantiofacial selectivity of epoxyeicosatrienoic acid hydration by cytosolic epoxide hydrolase. J Biol Chem. 1993:268:6402-6407.

The invention claimed is:

1. A method of inducing vasodilation in a subject in need thereof, comprising administering to the subject 5,6 dihydroxyeicosatetraenoic acid (5,6-diHETE) lactone or a pharmaceutical composition comprising said 5,6-diHETE lactone.

2. A method of treating, preventing, or reducing the risk of developing, a disease, disorder or condition associated with microvascular dysfunction, comprising administering to a subject in need thereof 5,6 dihydroxyeicosatetraenoic acid (5,6-diHETE) lactone or a pharmaceutical composition comprising said 5,6-diHETE lactone.

3. The method of claim 2, wherein the disease, disorder or condition associated with microvascular dysfunction is selected from the group consisting of aging, amyloidosis, Chagas disease, chronic thromboembolic pulmonary hypertension, dementia, diabetes mellitus, drug abuse, heart failure with preserved ejection fraction (HFpEF), heart failure with reduced ejection fraction (HFrEF), hypertension, hypertrophic obstructive cardiomyopathy, idiopathic cardiomyopathy, inflammatory disease, ischemic cardiomyopathy, no-reflow phenomenon, obesity, obstructive sleep apnea, peripheral neuropathy, schizophrenia, stress related cardiomyopathy, systemic lupus erythematosus, systemic sclerosis, tumor angiogenesis, and vasospasm.

4. The method of claim 3, wherein the disease, disorder or condition associated with microvascular dysfunction is hypertension.

5. The method of claim 2, wherein the subject is non-responsive to at least one medication used for treating the disease, disorder or condition associated with microvascular dysfunction.

6. The method of claim 2, wherein the 5,6 dihydroxyeicosatetraenoic acid (5,6-diHETE) lactone or the pharmaceutical composition is suitable for administration in combination with an additional agent for treating the disease, disorder, or condition associated with microvascular dysfunction.

* * * * *